(12) United States Patent
Hattori

(10) Patent No.: US 6,212,751 B1
(45) Date of Patent: *Apr. 10, 2001

(54) METHOD AND APPARATUS FOR EXAMINING POSITION OF BOARD-SUPPORT PIN, AND METHOD AND APPARATUS FOR POSITIONING BOARD-SUPPORT PIN

(75) Inventor: Tomohiko Hattori, Kariya (JP)

(73) Assignee: Fuji Machine Mfg. Co., Ltd., Chiryu (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/206,307

(22) Filed: Dec. 7, 1998

(30) Foreign Application Priority Data

Jan. 6, 1998 (JP) .................................................. 10-000971

(51) Int. Cl.[7] ........................... B23Q 17/00; H01R 13/64; G01R 31/02; G06K 9/00
(52) U.S. Cl. ...................... 29/407.04; 439/680; 324/758; 382/145; 29/714
(58) Field of Search ............................... 29/407.04, 714, 29/720, 721, 830, 464; 439/76.11, 76.12, 79, 680, 681; 324/758, 754, 755; 348/87, 94, 95; 228/180.21, 6.2; 382/145, 146, 147, 149

(56) References Cited

U.S. PATENT DOCUMENTS

| | | | |
|---|---|---|---|
| 4,515,507 | * 5/1985 | Asai et al. | ............................ 414/226 |
| 5,694,219 | * 12/1997 | Kim | .................................... 356/375 |
| 6,000,523 | * 12/1999 | Asai et al. | ....................... 198/377.08 |

FOREIGN PATENT DOCUMENTS

| | | |
|---|---|---|
| 0413495 | * 4/1992 | (JP) . |
| 7-15191 | 1/1995 | (JP) . |
| 09061116 | * 3/1997 | (JP) . |
| 10-159930 | 6/1998 | (JP) . |
| 11121996 | * 4/1999 | (JP) . |

* cited by examiner

Primary Examiner—S. Thomas Hughes
Assistant Examiner—John C. Hong
(74) Attorney, Agent, or Firm—Oliff & Berridge, PLC

(57) ABSTRACT

A method of examining a position of at least one board-support pin which is positioned on a board-support base for supporting a printed-circuit board under a back surface thereof, the method including the steps of taking an image of the board-support pin, at a position opposed to a free end of the pin, judging whether the position of the board-support pin is appropriate, based on the taken image, and producing judgment information indicative of a result of the judgment.

12 Claims, 11 Drawing Sheets

METHOD AND APPARATUS FOR EXAMINING POSITION OF BOARD-SUPPORT PIN, AND METHOD AND APPARATUS FOR POSITIONING BOARD-SUPPORT PIN

BACKGROUND OF THE INVENTION

1. Field of the Invention

The present invention relates to a method and an apparatus for examining a position of at least one board-support pin which is positioned on a board-support base for supporting a printed-circuit board under a back surface thereof, and a method and an apparatus for positioning at least one board-support pin on a board-support base.

2. Related Art Statement

It is widely practiced to produce an electric circuit by mounting electric components (ECs, e.g., electronic components) on a printed-circuit board (PCB). When the ECs are mounted on the PCB, at least one support member is used to support the PCB under a back surface thereof so as to prevent the PCB from sagging down. In the case where one or more ECs have already been mounted on the back surface of the PCB, the PCB can be supported at only limited portions of the back surface of the PCB. In this case, the PCB is supported, under the back surface thereof, by a free end of at least one board-support pin. To support the PCB at one or more limited portions of the back surface of the PCB, it is required to position the board-support pin at an arbitrary position on a board-support base. There is known a board supporting device which can do it.

However, if the position of the board-support pin positioned on the board-support base by the board supporting device is not appropriate, the board-support pin may support the PCB at a portion of the back surface of the PCB on which one or more ECs have been mounted. The inappropriate positioning of the board-support pin may cause a problem that the board-support pin interferes with at least one EC mounted on the back surface of the PCB. Therefore, it is needed to examine whether the actual position of the board-support pin is appropriate or not, after the board-support pin is positioned on the board-support base. Conventionally, this examination is done by an operator. Accordingly, the examination takes a lot of time, and cannot enjoy high accuracy.

SUMMARY OF THE INVENTION

It is therefore an object of the present invention to provide a method and an apparatus for speedily and reliably examining whether a position of at least one board-support pin on a board-support base is appropriate.

The present invention provides a method and an apparatus for examining a position of at least one board-support pin on a board-support base, and a method and an apparatus for positioning at least one board-support pin on a board-support base which respectively include the aforesaid method and apparatus for examining a position of the board-support pin. The invention methods and apparatuses have one or more of technical features which are described below in respective paragraphs given parenthesized sequential numbers (1) to (21). Any technical feature which includes another technical feature shall do so by referring, at the beginning, to the parentiesized sequential number given to the technical feature. Thus, two or more of the following technical features may be combined, if appropriate. Each technical feature may be accompanied by a supplemental explanation, as needed.

(1) According to a first feature of the present invention, there is provided a method of examining a position of at least one board-support pin which is positioned on a board-support base for supporting a printed-circuit board under a back surface thereof, the method comprising the steps of: taking an image of the board-support pin, at a position opposed to a free end of the pin; judging whether the position of the board-support pin is appropriate, based on the taken image; and producing judgment information indicative of a result of the judgment. In the present method, the position of the board-support pin is detected by taking the image of the board-support pin, the judgment of whether the position of the board-support pin is appropriate is automatically made, and the judgment information indicative of the result of the judgment is produced. The examination according to the present method is done more speedily and more accurately in comparison with a case where an operator examines the position of the board-support pin. As described below, the judgment information may be displayed on a display device so that the operator can recognize the result of the judgment, and/or may be supplied to a pin-position correcting device so that the pin-position correcting device automatically corrects the position of the board-support pin.

(2) According to a second feature of the present invention which includes the first feature (1), the method further comprises a step of displaying the judgment information on a display device so that an operator recognizes the judgment information. According to the judgment information displayed on the display device, the operator can recognize that the board-support pin is positioned at an inappropriate position, and correct the inappropriate position of the board-support pin. The judgment information may include the direction and amount of dislocation of the inappropriate position of the board-support pin from a reference position of the pin, in addition to the result of the judgment. In accordance with the judgment information displayed on the display device, the operator can more easily correct the inappropriate position of the board-support pin.

(3) According to a third feature of the present invention which includes the first or second feature (1) or (2), the method further comprises a step of supplying the judgment information to a pin-position correcting device so that the pin-position correcting device automatically corrects the position of the board-support pin, based on the judgment information. In this case, the inappropriate position of the board-support pin is automatically corrected by the pin-position correcting device, whereby the operator's load is further reduced.

(4) According to a fourth feature of the present invention which includes any one of the first to third features (1) to (3), the step of taking the image of the board-support pin comprises taking the image of the board-support pin, with an image taking device which is for taking an image of each of a plurality of reference board marks provided on the printed-circuit board so as to detect a position of the printed-circuit board. In the present method, the image taking device is used for taking the image of the board-support pin in addition to the image of each of the reference board marks. Thus, the present method can be performed using an apparatus which can be produced at low cost. Generally, a plurality of reference board marks are provided at a plurality of positions being apart from one another on a PCB, so that the position of the PCB may be accurately detected. Similarly, a plurality of board-support pins may be positioned at a plurality of positions being apart from one another on the board-support base. Therefore, it is needed to move the image taking device relative to the PCB in a direction parallel to the PCB. Since the image taking device is used for taking both the image of the board-support pin and the image of each of the reference board marks, a single moving device for moving one of the image taking device and the PCB relative to the other of the image taking device and the PCB can also be used for taking both of the images. The use of the single moving device further reduces the production cost of the apparatus.

(5) According to a fifth feature of the present invention which includes any one of the first to fourth features (1) to (4), a reference pin mark is provided on a free-end surface of the board-support pin, the free-end surface provides a board-support surface for supporting the printed-circuit board, and the step of taking the image of the board-support pin comprises taking an image of the reference pin mark. In the case where the free-end surface of the board-support pin is relatively small, an image of the free-end surface itself may be taken as the image of the board-support pin. On the other hand, in the case where the free-end surface of the pin is relatively large, it is preferable that an image of a reference pin mark provided on the free-end surface be taken as the image of the board-support pin. Generally, as the area of the image taken by the image taking device decreases, the accuracy of detection of the pin position improves. On the other hand, generally, the accuracy of positioning of the board-support pin is relatively low. Even if the image area may be decreased, it is required that an object whose image is taken by the image taking device fall within the image area. Therefore, it is preferable to take an image of the reference pin mark which is smaller than the free-end surface of the board-support pin. Specifically, in the case where the image taking device for taking the image of each of the reference board marks is used for taking the image of the board-support pin, it is not recommended to widen the image area of the image taking device to be able to take an image of the relatively large free-end surface of the board-support pin. Since each of the reference board marks is relatively small, the widening of the image area may deteriorate the accuracy of detection of the position of the each reference board mark.

(6) According to a sixth feature of the invention which includes the fifth feature (5), a hole is formed in the board-support pin so as to open in the free-end surface of the pin, and the reference pin mark comprises the opening of the hole. Since the hole opens in the free-end surface of the board-support pin, there is a difference in brightness between the image of the opening of the hole and the image of the free-end surface. Accordingly, it is possible to employ the opening of the hole as the reference pin mark. If the hole is formed through the board-support pin in its axial direction, the air sucked into the hole from the free-end surface of the pin can be ejected from a bottom surface of the board-support pin. In this case when the bottom surface of the pin contacts the board-support base, the ejected air blows off dust or the like present on a portion of the board-support base on which the pin is to be positioned.

(7) According to a seventh feature of the present invention which includes any one of the first to sixth features (1) to (6), the step of judging whether the position of the board-support pin is appropriate comprises comparing the taken image with reference-pin-position information indicative of a reference position of the pin. For example, the reference-pin-position information may be a reference image of the pin positioned at its reference position, or a set of pin-position data indicative of the reference position of the pin on an X-Y coordinate plane. In the case where the reference image is employed as the reference-pin-position information, the taken image of the pin is directly compared with the reference image. On the other hand, in the case where the set of pin-position data (i.e., the reference X and Y coordinates) is employed as the reference-pin-position information, the actual X and Y coordinates of the board-support pin on the X-Y coordinate plane are calculated based on the taken image of the pin, and then the actual coordinates are compared with the reference X and Y coordinates. In both cases, it is judged that the position of the board-support pin is appropriate when respective errors of the actual X and Y coordinates of the pin from the reference X and Y coordinates of the pin fall within a predetermined range.

(8) According to an eighth feature of the present invention which includes any one of the first to sixth features (1) to (6), the step of judging whether the position of the board-support pin is appropriate comprises comparing the taken image with reference-component-position information indicative of a reference position of at least one electric component mounted on the back surface of the printed-circuit board. For example, a safety region is set around the reference image of the free-end surface of the board-support pin, based on errors produced when the image of the pin is taken, and/or errors produced when the EC is mounted on the PCB. It is judged that the position of the board-support pin is appropriate, if the safety region does not overlap the reference position of the EC mounted on the back surface of the PCB. In the present method, whether a template or at least one set of predetermined data which defines at least one reference position is appropriate is also examined.

(9) According to a ninth feature of the present invention, there is provided a method of positioning at least one board-support pin on a board-support base for supporting a printed-circuit board under a back surface thereof, the method comprising the steps of positioning the at least one board-support pin on the board-support base according to at least one reference position defined by a template which is located above the board-support base, the template having a pin-position standard which defines the reference position, taking an image of the board-support pin, at a position opposed to a free end of the pin, judging whether the position of the board-support pin is appropriate, based on the taken image, and producing judgment information indicative of a result of the judgment.

(10) According to a tenth feature of the present invention which includes the ninth feature (9), the step of positioning the board-support pin on the board-support base comprises fixing the pin to the base by utilizing a magnetic attraction force produced by an electromagnet.

(11) According to an eleventh feature of the present invention, there is provided a method of positioning at least one board-support pin on a board-support base for supporting a printed-circuit board under a back surface thereof, the method comprising the steps of automatically positioning, with a pin positioning device, the at least one board-support pin on the board-support base, based on at least one set of predetermined data; and examining a position of the board-support pin by taking an image of the pin, at a position opposed to a free end of the pin, judging whether the position of the board-support pin is appropriate, based on the taken image, and producing judgment information indicative of a result of the judgment. In the present method, the board-support pin is automatically positioned on the board-support base, whereby the operator's load is more reduced. The step of automatically positioning the board-support pin may be performed independent of the step of examining the position of the board-support pin.

(12) According to a twelfth feature of the present invention which includes the eleventh feature (11), the method further comprises a step of correcting the position of the board-support pin, based on the produced judgment information. The step of correcting the position of the board-support pin may be performed independent of the step of examining the position of the board-support pin.

(13) According to a thirteenth feature of the present invention which includes the twelfth feature (12), the step of correcting the position of the board-support pin comprises correcting the position of the board-support pin, with the pin positioning device. The correction of position of the board-support pin is automatically performed by the pin positioning device, whereby the operator's load is more reduced.

(14) According to a fourteenth feature of the present invention which includes any one of the eleventh to thirteenth features (11) to (13), the step of positioning the board-support pin on the board-support base comprises fixing the pin to the base by utilizing a magnetic attraction force produced by an electromagnet. By controlling the energization and deenergization of the electromagnet to produce or cut the magnetic attraction force, the board-support pin is easily attached to, or detached from, the board-support base. More particularly, the step of positioning the board-support pin on the board-support base or the step of correcting the position of the board-support pin is easily performed. The step of fixing the pin to the base may be performed independent of the step of examining the position of the board-support pin.

(15) According to a fifteenth feature of the present invention, there is provided an apparatus for examining a position of at least one board-support pin which is positioned on a board-support base for supporting a printed-circuit board under a back surface thereof, the apparatus comprising: an image taking device which takes an image of the board-support pin, at a position opposed to a free end of the pin; a moving device which moves at least one of the image taking device and the board-support base relative to the other of the image taking device and the board-support base in a direction parallel to the board-support base; a first controller which controls the moving device such that the image taking device is positioned at the position opposed to the free end of the board-support pin; and a judging device which judges whether the position of the board-support pin is appropriate, based on the image taken by the image taking device, and which produces judgment information indicative of a result of the judgment. The present apparatus advantageously performs the method of examining a position of at least one board-support pin.

(16) According to a sixteenth feature of the present invention which includes the fifteenth feature (15), the apparatus further comprises a second controller which controls the moving device such that the image taking device is positioned at each of a plurality of positions respectively opposed to a plurality of reference board marks provided on the printed-circuit board.

(17) According to a seventeenth feature of the present invention, there is provided an apparatus for positioning at least one board-support pin on a board-support base for supporting a printed-circuit board under a back surface thereof, the apparatus comprising: a pin fixing device which fixes the board-support pin to the board-support base; an image taking device which takes an image of the board-support pin at a position opposed to a free end of the pin fixed to the board-support base by the pin fixing device; a moving device which moves at least one of the image taking device and the board-support base relative to the other of the image taking device and the board-support base in a direction parallel to the board-support base; a controller which controls the moving device such that the image taking device is positioned at the position opposed to the free end of the board-support pin; and a judging device which judges whether the position of the board-support pin is appropriate, based on the image taken by the image taking device, and which produces judgment information indicative of a result of the judgment. The present apparatus advantageously performs the method of positioning at least one board-support pin on a board-support base.

(18) According to an eighteenth feature of the present invention which includes the seventeenth feature (17), the apparatus further comprises a pin-position defining device which defines at least one reference position.

(19) According to a nineteenth feature of the present invention which includes the eighteenth feature (18), the pin-position defining device comprises a template which defines the at least one reference position.

(20) According to a twentieth feature of the present invention which includes the eighteenth or nineteenth feature (18) or (19), the pin-position defining device comprises a memory which stores at least one set of pin-position data indicative of the at least one reference position.

(21) According to a twenty-first feature of the present invention which includes the twentieth feature (20), the apparatus further comprises a pin positioning device which positions, on the board-support base, the board-support pin at the reference position indicated by the set of pin-position data.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which.

DETAILED DESCRIPTION OF THE PREFERRED EMBODIMENTS

Referring to FIGS. 1 to 7, there will be described an electronic component (EC) mounting system 12 to which the present invention is applied.

Figure 1:
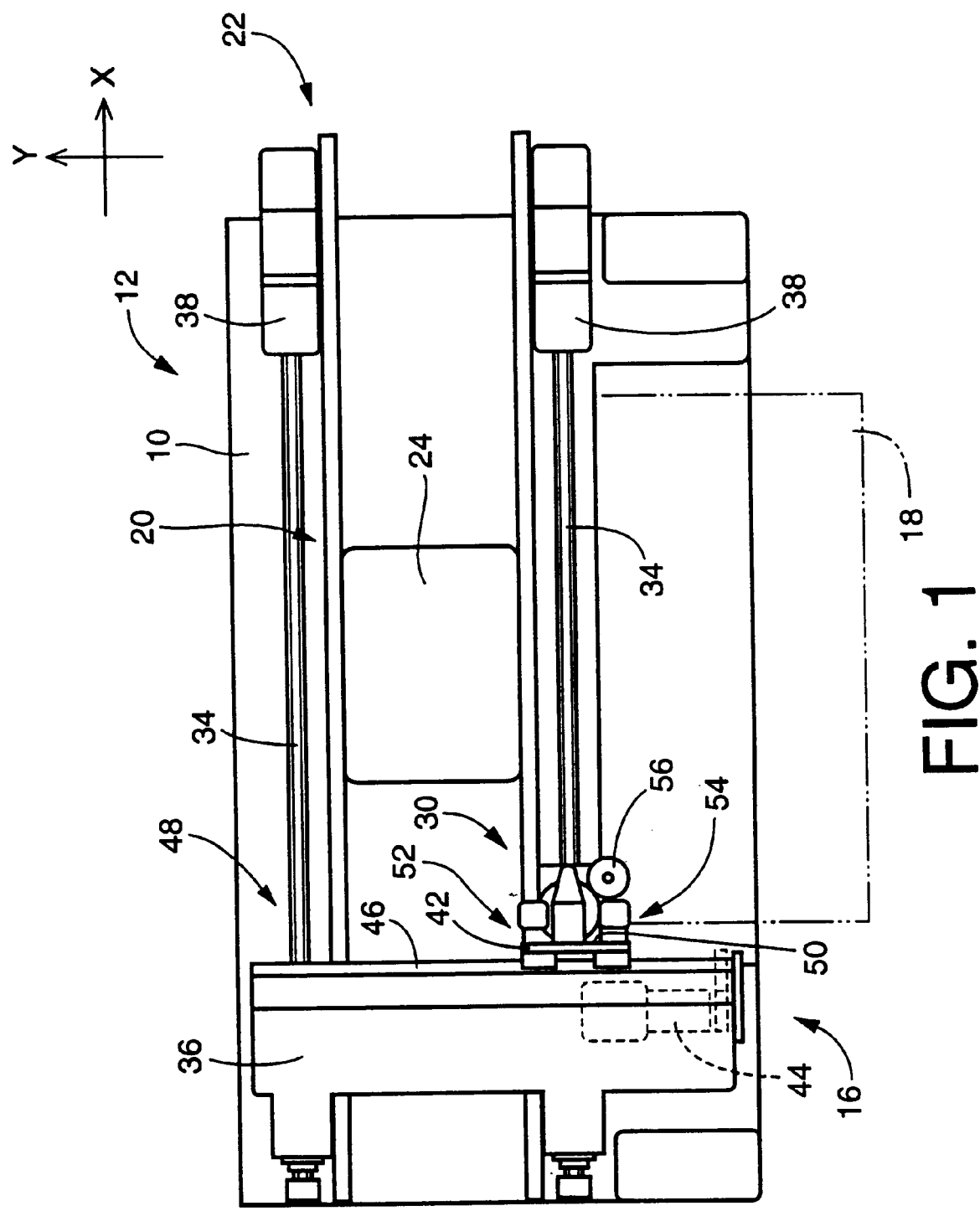
FIG. 1 is a schematic plan view of an electronic component (EC) mounting system which embodies the present invention.

In FIG. 1, the EC mounting system 12 includes an EC mounting device 16, an EC supplying device 18, and a board supporting device 20 which are provided on a table 10. The board supporting device 20 includes a board conveyor 22 which extends in an X-axis direction. The board conveyor 22 conveys a printed-circuit board (PCB) 24 to a predetermined EC-mount position at which the PCB 24 is supported by the board supporting device 20 and ECs 32 are mounted on the PCB 24. The board supporting device 20 will be described later. The EC supplying device 18 is provided on one side of the board conveyor 22. The detailed description of this EC supplying device 18 is omitted because the EC supplying device 18 is not relevant to the present invention.

The EC mounting device 16 includes a component holder head 30 which is linearly moved in the X-axis direction and a Y-axis direction perpendicular to the X-axis direction. The component holder head 30 carries an EC 32 and mounts the EC 32 on the PCB 24. On both sides of the board conveyor 22 in the Y-axis direction, two ball screws 34 are provided so as to extend parallel to the X-axis direction. Two nuts (not shown) which are fixed to an X-axis table 36 are respectively engaged or screwed with the two ball screws 34. Therefore, when the two ball screws 34 are respectively rotated by two X-axis-table drive servomotors 38, the X-axis table 36 is moved in the X-axis direction. On the table 10, two guide rails (not shown) as guide members are provided under the two ball screws 34. The X-axis table 36 is provided with two guide blocks (not shown) as guided members which are slidably fitted on the two guide rails, respectively. Thus, the movement of the X-axis table 36 is guided by the cooperation of the guide rails and the guide blocks. On the X-axis table 36, a ball screw (not shown) is provided so as to extend parallel to the Y-axis direction. A nut (not shown) fixed to a Y-axis table 42 is engaged or screwed with the ball screw. When the ball screw is rotated by a Y-axis-table drive servomotor 44, the Y-axis table 42 is moved in the Y-axis direction while being guided by a pair of guide rails 46 as guide members (In FIG. 1, only one of the two guide rails 46 is shown.) The two nuts, the two ball screws 34, the X-axis table 36 and the two X-axis-table drive servomotors 38, and the nut, the ball screw 40, the Y-axis table 42 and the Y-axis-table drive servomotor 44 serve as an X-Y robot 48.

The X-axis table 36 is provided with a charged-coupled device (CCD) camera as an image taking device which takes an image of the EC 32 held by the component holder head 30. The CCD camera is located at a position lower than Y-axis table 42 and between the EC supplying device 18 and the board supporting device 20 in the Y-axis direction. Since the CCD camera is not relevant to the present invention, the detailed description of the CCD camera is omitted.

The component holder head 30 is vertically, movably and rotatably attached to a side surface 50 of the Y-axis table 42. The side surface 50 is perpendicular to the table 10. Additionally, on the side surface 50 of the Y-axis table 42, there are provided an elevating and lowering device 52 which elevates and lowers the component holder head 30, a rotating device 54 which rotates the holder head 30 about a center line thereof, and a CCD camera 56 which takes an image of each of a plurality of reference board marks provided on the PCB 24.

Figure 3:
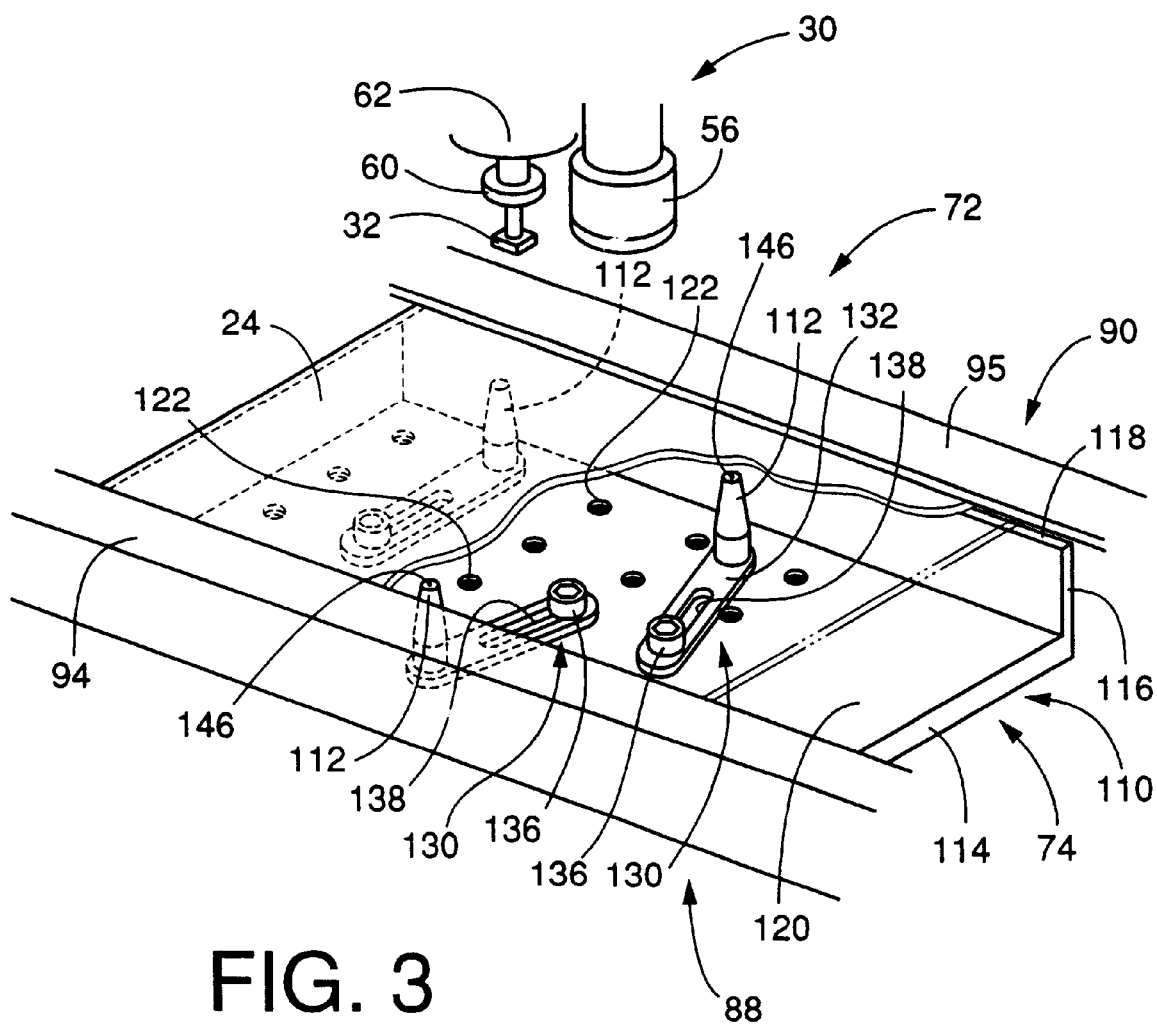
FIG. 3 is a perspective view of a board-support pin device of the board supporting device.

The component holder head 30 includes, as shown in FIG. 3, a suction nozzle 60 which sucks and holds the EC 32, and a nozzle holder 62 which holds the suction nozzle 60. The nozzle holder 62 is moved by the X-Y robot 48. The suction nozzle 60 is connected, through an air passage, to a vacuum (negative air pressure) source, a positive air pressure source, and the atmosphere, via a rotary valve, a hose, and a solenoid-operated direction-control valve (not shown). By switching the direction-control valve, the suction nozzle 60 is selectively communicated with one of the vacuum source, the positive air pressure source, and the atmosphere.

Figure 2:
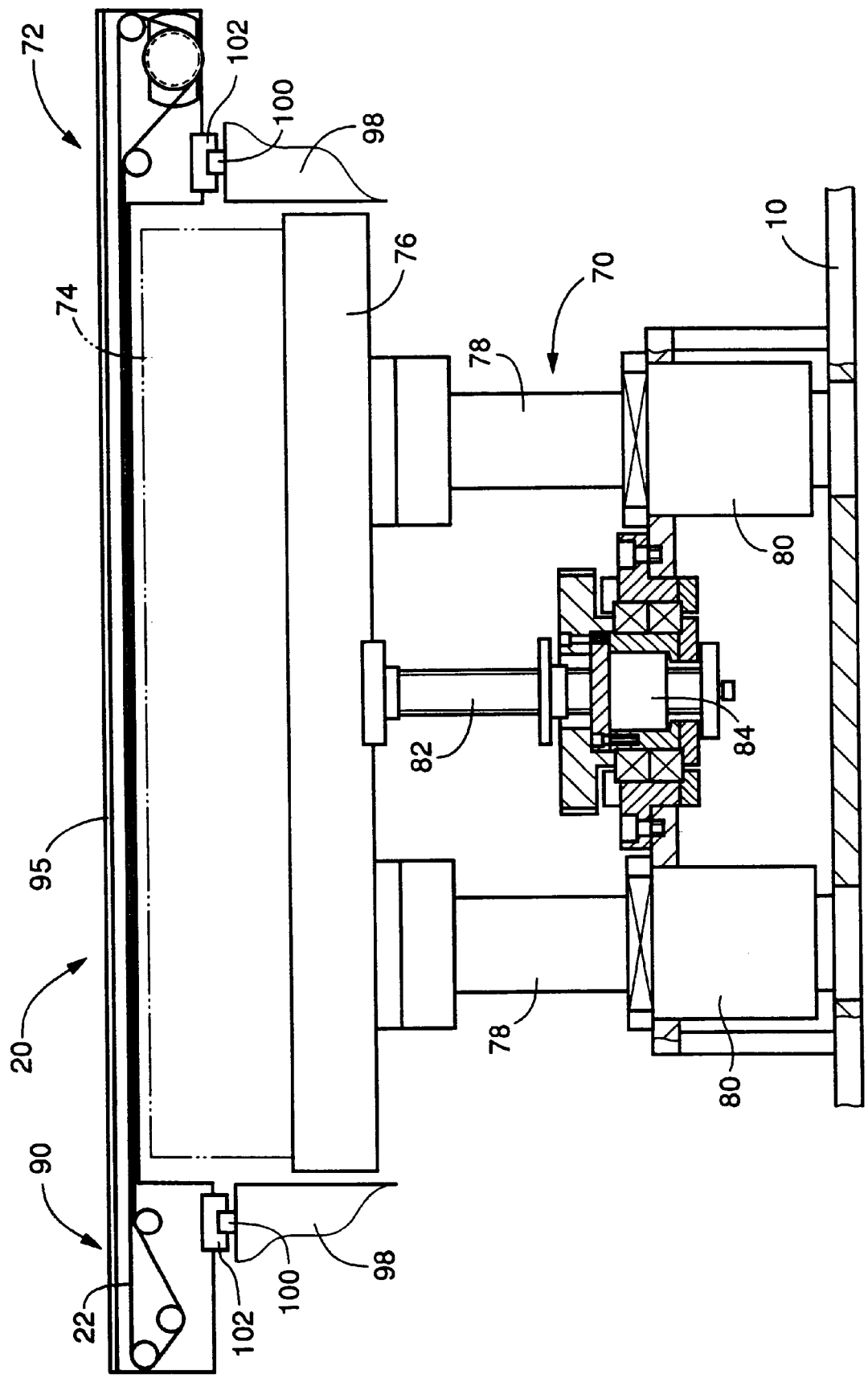
FIG. 2 is a partly cross-sectioned, front elevation view of a board supporting device of the EC mounting system.

As shown in FIG. 2, the board supporting device 20 includes a board elevating and lowering device 70, a board clamping device 72 and a board-support pin device 74. The board elevating and lowering device 70 includes a board lifter 76. A pair of guide rods 78 extend from a lower surface of the board lifter 76 which is opposite to the table 10. The two guide rods 78 are slidably engaged with two cylinders 80, respectively, which are fixed to the table 10. Moreover, a ball screw 82 is fixed to the lower surface of the board lifter 76. The ball screw 82 is engaged or screwed with a nut 84 which is attached to the table 10 such that the nut 84 is rotatable about an axis line perpendicular to the table 10 and is immovable in its axial direction. When the nut 84 is rotated by an elevating and lowering servomotor 86 (FIG. 6), the ball screw 82 is moved upward and downward, whereby the board lifter 76 is elevated and lowered.

The board clamping device 72 includes a fixed guide 88 (FIG. 3) and a movable guide 90 each of which extends parallel to a PCB-convey direction in which the PCB 24 is conveyed (that is, the X-axis direction). The board conveyor 22 is disposed between respective opposite surfaces of the fixed and movable guides 88, 90, and conveys the PCB 24. Two board hold-down portions 94, 95 are integrally formed with respective upper end portions of the fixed and movable guides 88, 90. The board hold-down portions 94 of the fixed guide 88 shortly projects toward the movable guide 90. The board hold-down portion 95 of the movable guide 90 shortly projects toward the fixed guide 88. A small space is left between each of the board hold-down portions 94, 95 and an upper surface of the PCB 24 placed on the board conveyor 22.

The movable guide 90 is supported by the table 10 such that the movable guide 90 is movable in a direction perpendicular to the PCB-convey direction. Two support blocks 98 are fixed to the table 10. As shown in FIG. 2, two guide rails 100 are provided on respective upper surfaces of the two support blocks 98. The guide rails 100 extend in the direction perpendicular to the PCB-convey direction. Two guide blocks 102 are fixed to a lower surface of the movable guide 90. The guide blocks 102 are fitted on the guide rails 100, respectively, so that the movable guide 90 is guided by the guide rails 100. The movable guide 90 is moved by a moving device (not shown) including a feed screw and a nut, so that the movable guide 90 is moved toward, and apart from, the fixed guide 88.

The board-support pin device 74 is disposed on the board lifter 76. As shown in FIG. 3, the board-support pin device 74 includes a board-support base 110 and a plurality of board-support pins 112 attached to the board-support base 110. The board-support base 110 has a bottom wall 114 and a pair of side walls 116 parallel to the X-axis direction. Accordingly, the board-support base 110 has a generally U-shaped cross section. Respective upper surfaces of the pair of side walls 116 provide two horizontal support surfaces 118 for supporting the PCB 24 under opposite end portions of a back surface of the PCB 24. An upper surface of the bottom wall 114 provides a horizontal pin-attachment surface 120. The pin-attachment surface 120 has a plurality of threaded holes which are formed at equal intervals in each of the X-axis and Y-axis directions. The current board-support base 110 needs to be replaced with a different board-support base, depending upon the size of the next PCB 24.

Figure 4:
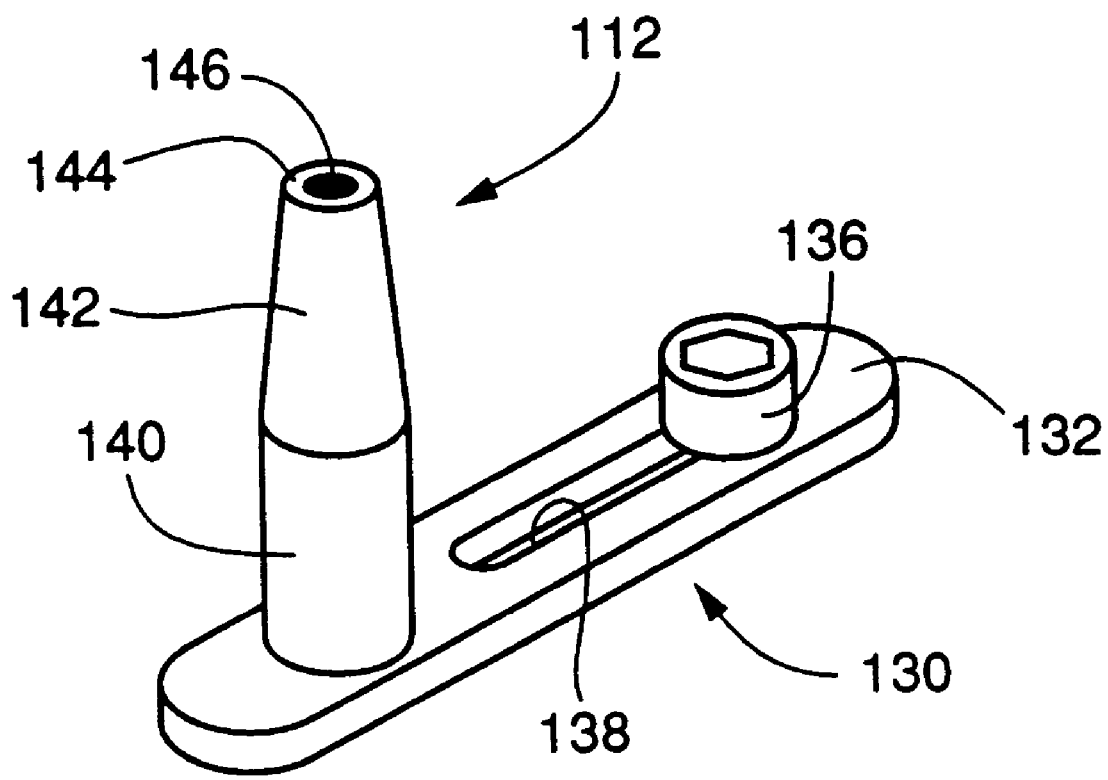
FIG. 4 is a perspective view of a board-support pin and a pin fixing device of the board-support pin device of FIG. 3.

Each board-support pin 112 is fixed to the board-support base 110 by a pin fixing device 130. As shown in FIG. 4, the pin fixing device 130 includes a support plate 132 having an elongate shape, and a bolt 136 as a fixing member for fixing the support plate 132 to the board-support base 110. In one half portion of the support plate 132, an elongate hole 138 is formed so as to extend parallel to a longitudinal direction of the support plate 132. Through the elongate hole 138, the bolt 136 is engaged with one of the threaded holes 122 formed in the board-support base 110. The board-support pin 112 is vertically fixed to the other half portion of the support plate 132. Accordingly, the support plate 132 to which the board-support pin 112 is fixed can be rotated around the bolt 136 and linearly moved along the elongate hole 138. The combination of the rotation and linear movement of the support plate 132 permits the board-support pin 112 to be positioned at an arbitrary position in an annular area which surrounds the one threaded hole 122. The threaded holes 122 have respective annular areas. The sum of the respective annular areas of all the threaded holes 122 covers an entire upper surface of the board-support base 110. Therefore, it is possible to position the board-support pin 112 at an arbitrary position on the entire upper surface of the board-support base 110.

Each board-support pin 112 includes a cylindrical base portion 140, and a free end portion 142 having a truncated cone shape. The diameter of the free end portion 142 decreases in a direction toward a free-end surface thereof. Accordingly, the diameter of the free-end surface is smaller than that of the base portion 140. The free-end surface provides a horizontal board-support surface 144 for supporting the PCB 24. The board-support surface 144 is a small surface. In a central portion of the board-support surface 144, a reference pin mark 146 is provided. The reference pin mark 146 may be a hole which is formed in the central portion of the board-support surface 144 so as to open in the surface 144. The length of the board-support pin 112 attached to the board-support base 110 is predetermined such that the board-support surface 144 of the board-support pin 112 and the support surfaces 118 of the board-support base 110 are located on the same horizontal plane.

Figure 5:
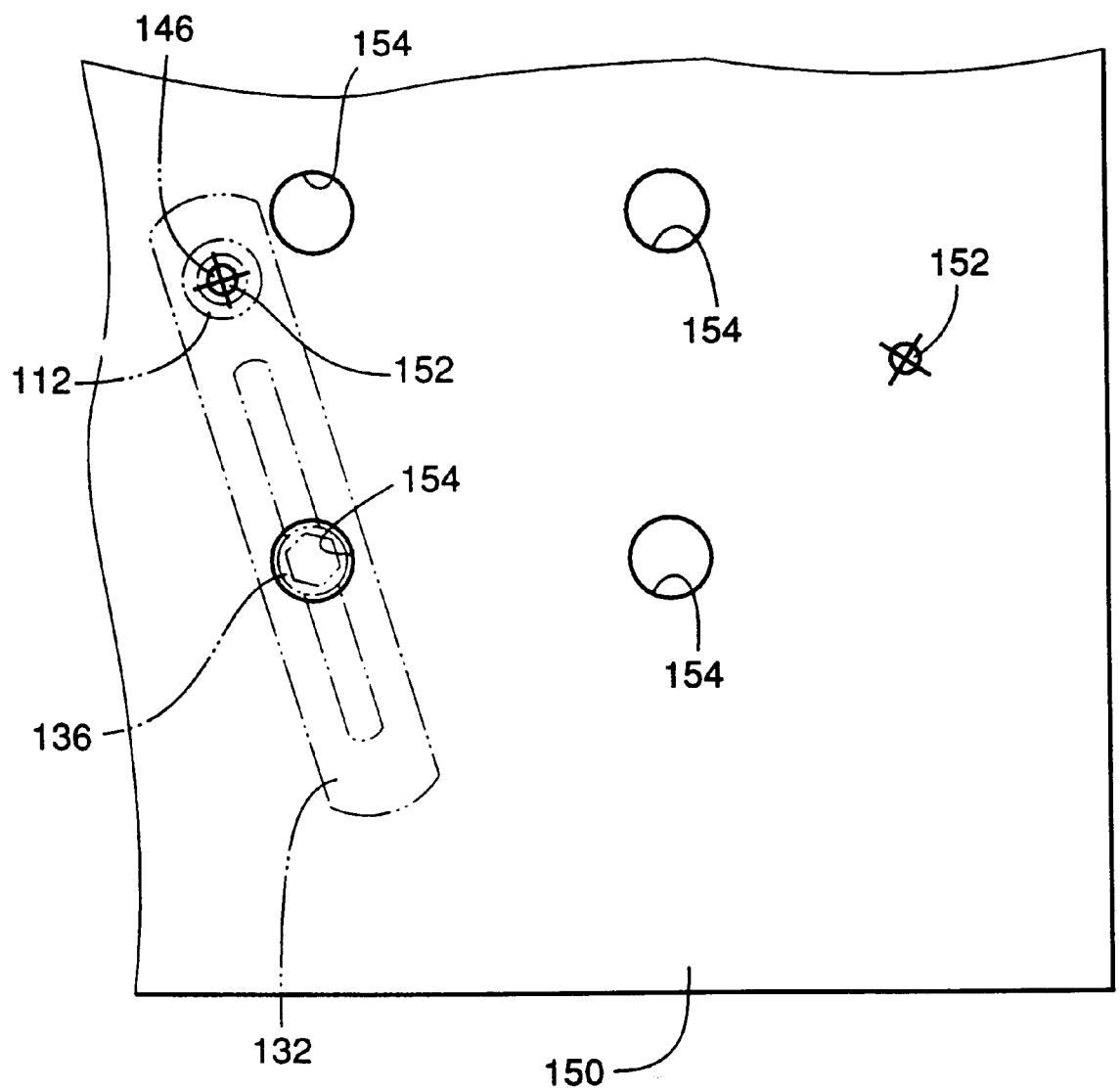
FIG. 5 is a plan view of a template used for positioning at least one board-support pin on a board-support base of the board-support pin device.

When each board-support pin 112 is attached to the board-support base 110, a template 150 shown in FIG. 5 is used. The template 150 is formed of a transparent plate. The current template 150 may be replaced with a different template, depending on the size of the next PCB 24. The template 150 has pin-position marks 152 and tool insertion holes 154. The pin-position marks 152 are formed at respective positions corresponding to the positions where the board-support pins 112 are attached. The tool insertion holes 154 are formed at respective positions corresponding to the threaded holes 122. Each pin-position mark 152 includes a circle having the same diameter as that of each reference pin mark 146, and cross lines indicative of the center of the circle. The pin-position mark 152 is provided at a position corresponding to a portion of the back surface of the PCB 24 which portion is free from the ECs 32. Like the PCB 24, the template 150 is positioned and supported by the board supporting device 20.

Figure 6:
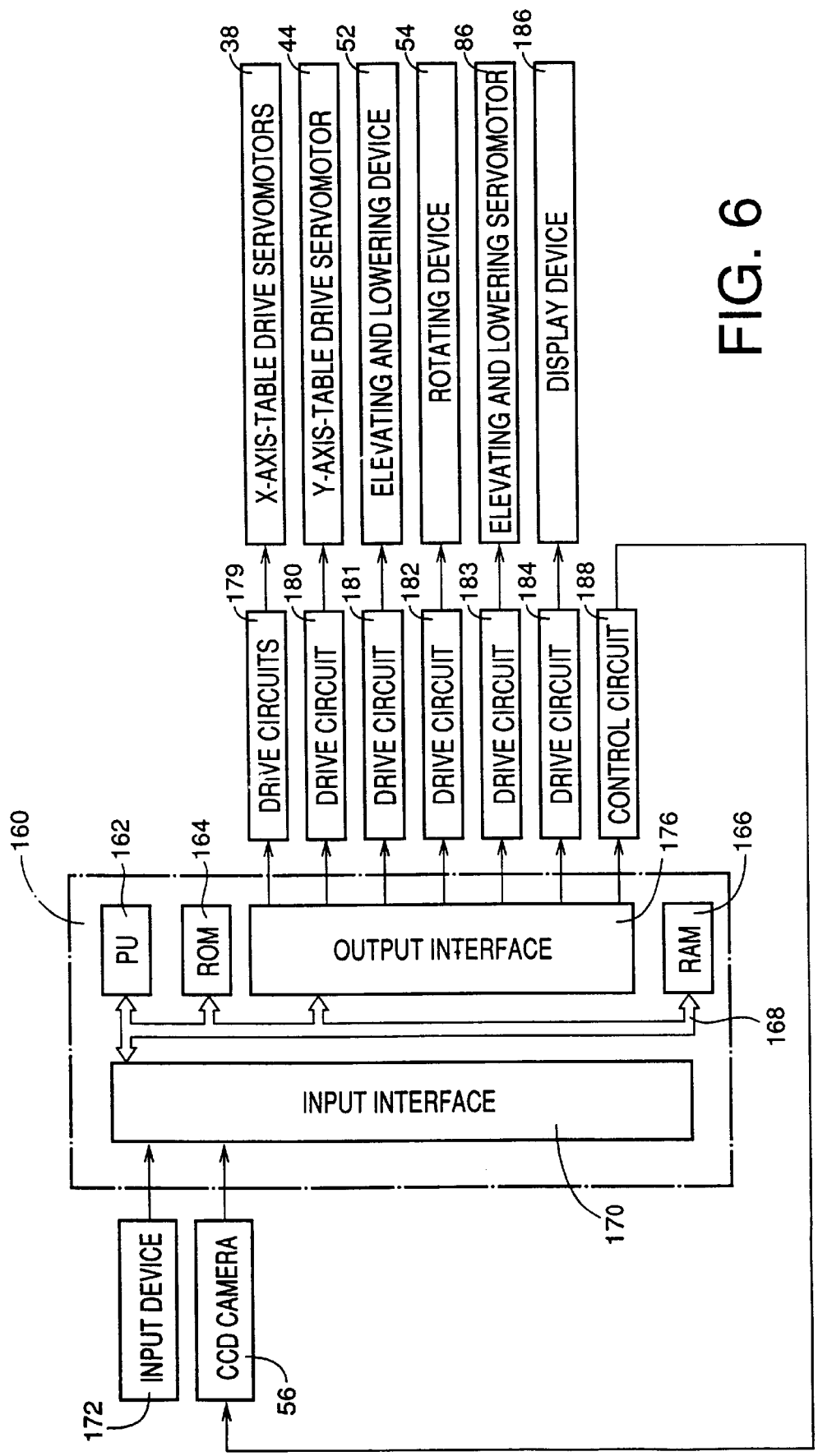
FIG. 6 is a block diagram of a relevant portion of a control device of the EC mounting system.

The present EC mounting system 12 is controlled by a control device 160 as shown in FIG. 6. The control device 160 is primarily provided by a microcomputer including a processing unit (PU) 162, a read only memory (ROM), a random access memory (RAM), an input interface 170, and an output interface 176 which are connected to one another via a bass 168. The input interface 170 is connected to an input device 172, and the CCD camera 56 for taking the images of the reference board marks provided on the PCB 24 and the images of the reference pin marks 146 of the board-support pins 112. The input device 172 includes an operation panel and a key board each of which is operable by the operator to input his or her instructions. The output interface 176 is connected to the X-axis-table drive servomotors 38, the Y-axis-table drive servomotor 44, the elevating and lowering device 52 for elevating and lowering the component holder head 30, the rotating device 54 for rotating the holder head 30 about the center line thereof, the solenoid-operated direction-control valve for controlling the EC sucking operation of the component holder head 30, the elevating and lowering servomotor 86 for elevating and lowering the board lifter 76, the moving device for moving the movable guide 90, and a display device 186 via respective drive circuits 179, 180, 181, 182, 183, 184. Further, the output interface 176 is connected to the CCD camera 56 via a control circuit 188. The display device 186 displays a screen image representing output information which the operator can recognize. Each of the above-mentioned motors 38, 44, 86 is a servomotor as a sort of electric motor as a drive source. However, in place of the servomotors, stepper motors may be employed. That is, any sort of motors which are controllable with respect to their rotation angle may be employed.

Figure 7:
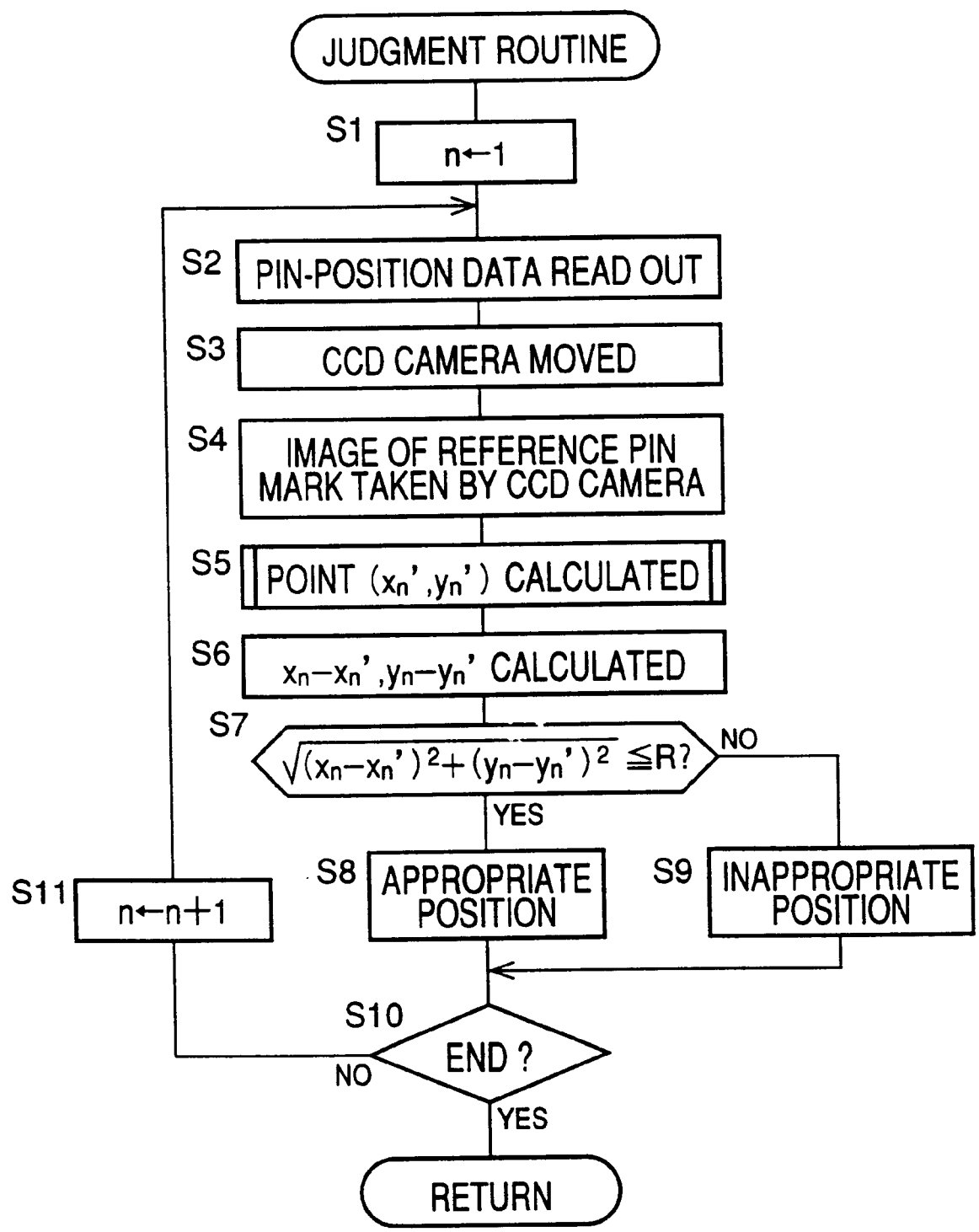
FIG. 7 is a flow chart representing a judgment routine for judging whether the position of each board-support pin is appropriate, the judgment routine being stored in a read only memory (ROM) of the control device.

The RAM 166 of the control device 160 includes a pin-position data memory. In the pin-position data memory, pin-position data indicative of at least one reference position corresponding to each of different sorts of PCBs. For example, the board-support pins 112 are given respective pin numbers "n" (n=1, 2, 3, . . . ). A center point of each of the board-support pins 112 corresponding to the respective pin numbers "n" is indicated as a point, $(X_n, Y_n)$, on an X-Y coordinate plane. The point $(X_n, Y_n)$ corresponding to each of the pin numbers "n" is stored as a set of pin-position data in the pin-position data memory. Moreover, various programs, such as a program for mounting the ECs 32 on the PCB 24 and a judgment routine represented by a flow chart of FIG. 7, are stored in the ROM 164.

In the above-mentioned EC mounting system 12, before the ECs 32 are mounted on the PCB 24, the plurality of board-support pins 112 are attached to the board-support base 110, according to the specific sort of the PCB 24. First, the template 150 is conveyed by the board conveyor 22, and is positioned above the board lifter 76. The positioning of the template 150 is carried out by a stopper (not shown) provided on a downstream side thereof as seen in the PCB-convey direction. Next, the operator places each of the fixing devices 130 on the board-support base 110 such that each of the board-support pins 112 is positioned below a corresponding one of the pin-position marks 152 of the template 150. The bolt 136 is loosely screwed, through the elongate hole 138, in the corresponding threaded hole 122.

Subsequently, the board-support base 110 is elevated by the board lifter 76, so that the board-support pins 112 and the side walls 116 of the board-support base 110 support the template 150. As the board lifter 76 is further moved upward, the template 150 is pressed, by the side walls 116 of the board-support base 110, against the board hold-down portions 94, 95, away from the board conveyor 22. In this state, the operator adjusts the position of each of the board-support pins 112 such that the reference pin mark 146 of the each board-support pin 112 is accurately aligned with the corresponding pin-position mark 152 of the template 150, as shown in two-dot chain lines in FIG. 5. Then, the bolt 136 is fastened to the board-support base 110 by a tool inserted through the tool insertion hole 154, whereby the each board-support pin 112 is fixed to the board-support base 110.

After the fixing of the board-support pins 112 has been completed, the board-support base 110 and the board lifter 76 are lowered. Concurrently, the stopper is retracted to a retracted position thereof. After the retraction of the stopper, the board conveyor 22 is driven, and the template 150 is carried out. Next, there will be described the operation of examining the position of each of the board-support pins 112 fixed to the board-support base 110, by reference to the flow chart of FIG. 7.

The control of the PU 162 begins with Step S1 of the judgment routine of FIG. 7, where the pin number "n" is reset to "1". Step S1 is followed by Step S2. At Step S2, the set of pin-position data indicative of the point $(X_1, Y_1)$ corresponding to the pin number "1" is read out from the pin-position data memory of the RAM 166. Step S2 is followed by Steps S3 and S4. At Step S3, the component holder head 30 is moved by the X-Y robot 48 so that an optical axis of the CCD camera 56 is positioned at the point $(X_1, Y_1)$ on the X-Y coordinate plane. At Step S4, the reference pin mark 146 of one board-support pin 112 is taken by the CCD camera 56. The component holder head 30 is controlled so that the axis line of the suction nozzle 60 is positioned at a given point, but the point $(X_n, Y_n)$ is corrected in advance, by respective distances between the axis line of the suction nozzle 60 and the optical axis of the CCD camera 56 as measured in the X-axis and Y-axis directions. That is, the component holder head 30 is moved to the corrected point on the X-Y coordinate plane, whereby the optical axis of the CCD camera 56 is positioned at the point $(X_1, Y_1)$.

Step S4 is followed by Step S5. At Step S5, a point $(X_1', Y_1')$ indicative of a center point of the reference pin mark 146 is calculated by a known method, based on the taken image of the reference pin mark 146. The control of the PU 162 goes to Step S6. At Step S6, positional errors between the point $(X_1', Y_1')$ calculated at Step S5 and the point $(X_1, Y_1)$ read out at Step S2 are calculated. More specifically, a positional error with respect to the X axis is obtained by subtracting the value "$X_1'$" from the value "$X_1$", i.e., $(X_1-X_1')$. Likely, a positional error with respect to the Y axis is obtained by subtracting the value "$Y_1'$" from the value "$Y_1$", i.e., $(Y_1-Y_1')$. The obtained X-axis and Y-axis errors are stored in the RAM 166. Each error has a plus or a minus sign. Step S6 is followed by Step S7 to judge whether the obtained errors $(X_1-X_1')$, $(Y_1-Y_1')$ fall within a reference circular range having a radius R. If a positive judgment is made at Step S7, i.e., the position of the one board-support pin 112 is appropriate, the control of the PU 162 goes to Step S8. At Step S8, positive data indicative of the positive judgment is produced. Step S8 is followed by Step S10. On the other hand, if a negative judgment is made at Step S7, i.e., the position of the one pin 112 is not appropriate, the control of the PU 162 goes to Step S9. At Step S9, negative data indicative of the negative judgment is produced. The control of the PU goes to Step S10.

At Step S10, the PU 162 judges whether this routine should be ended. If a positive judgment is made at Step S10, this routine is ended. If a negative judgment is made at Step S10, the control of the PU 162 goes to Step S11 to add "1" to the pin number "n". In this control cycle, the pin number is set to "2" at Step S11, and the control of the PU 162 returns to Step S2 and the following steps. Until the positive judgment is made at Step S10, Steps S2–S9 and S11 are repeated. In each of the control cycles corresponding to the respective pin numbers, a center point of the corresponding reference pin mark 146, positional errors between the points $(X_1, Y_1)$ and $(X_1', Y_1')$, and a result of the judgment are stored in association with the corresponding pin number "n" in RAM 166.

When the operator inputs an instruction in the input device 172, a result of the judgment corresponding to each of the respective pin numbers "n" is displayed on the display device 186. When the result of the judgment is negative, that is, the position of the one board-support pin 112 is not appropriate, the positional errors between the actual point and the reference point of the reference pin mark 146 are also displayed. The operator corrects the position of the one board-support pin 112, based on the displayed information. After the correction of position of the one board-support pin 112, the template 150 is again positioned above the board-support base 110, and is fixed to the board hold-down portions 94, 95. The operator judges whether the reference pin mark 146 of the one board-support pin 112 is aligned with the corresponding pin-position mark 152 of the template 150. In the case where a negative judgment is made, and positional errors between the reference pin mark 146 and the pin-position mark 152 are equal to the positional errors displayed on the display device 186, the position of the one board-support pin 112 is corrected to zero the errors. On the other hand, in the case where the negative judgment is made, but the errors between the reference pin mark 146 and the pin-position mark 152 are not equal to the displayed errors, or in the case where a positive judgment is made, it is meant that the template 150 is inappropriate, or that the position of the pin-position mark 152 of the template 150 is inappropriate. If the operator recognizes that the template 150 is inappropriate, the template 150 is replaced with a correct template. If the operator recognizes that the position of the pin-position mark 152 is inappropriate, the position of the pin-position mark 152 is corrected.

After the board-support pins 112 are accurately attached to the board-support base 110 as described above, the PCB 24 is supported by the board supporting device 20 including the board-support pins 112, and the ECs 32 are mounted on the PCB 24. Like the template 150, the PCB 24 is carried in and positioned above the board-support base 110. When the PCB 24 is positioned above the board-support base 110, the board lifter 76 on which the board-support base 110 is mounted is elevated, and the board-support pins 112 support the PCB 24 under the back surface thereof. The board-support pins 112 do not interfere with the ECs 32 mounted on the back surface of the PCB 24 because the positions of the board-support pins 112 are predetermined not to interfere with the ECs 32.

After the PCB 24 is supported by the board supporting device 20 at the EC-mount position, the CCD camera 56 is moved, by the X-Y robot 48, to each of respective positions opposed to the reference board marks provided on the PCB 24, and an image of each of the reference board marks is taken by the CCD camera 56 similar to the examination of the board-support pins 112. Positional errors of the PCB 24 supported by the board supporting device 20 are detected, based on the taken images of the reference board marks, and the errors are stored in the RAM 166 of the control device 160. Then, the component holder head 30 picks up an EC 32 from the EC supplying device 18, and carries it to the EC-mount position. During the carrying of the EC 32 from the EC supplying device 18 to the EC-mount position, an image of the EC 32 held by the component holder head 30 is taken by the CCD camera provided for taking images of ECs, whereby positional and angular errors of the EC 32 held by the head 30 are detected. The distances of movement of the EC 32 are corrected based on the detected errors of the PCB 24 and the detected errors of the EC 32 held by the head 30, and the EC 32 held by the head 30 is rotated to correct the angular error of the EC 32. Thus, the EC 32 is mounted at an accurate position on the PCB 24 and with its correct attitude.

As is apparent from the foregoing description of the preferred embodiment, the CCD camera 56 provides an image taking device; and the X-Y robot 48 provides a moving device which moves the image taking device relative to the board-support base 110. The control device 160 provides a controller which controls the moving device; and a portion of the control device 160 that carries out the judgment routine stored in the ROM 164 provides a judging device.

In the illustrated embodiment, it is automatically judged whether the position of at least one board-support pin 112 is appropriate. Therefore, the operation of positioning the board-support pin 112 is speedily performed with high accuracy. Further, the image of the board-support pin 112 is taken by the CCD camera 56 which is for taking the images of the reference board marks provided on the PCB 24. Thus, the production cost of the system 12 is reduced in comparison with the case where, in addition to the CCD camera 56 for taking the images of the reference board marks, an image taking device for taking an image of the board-support pin 112 is employed.

Figure 8:
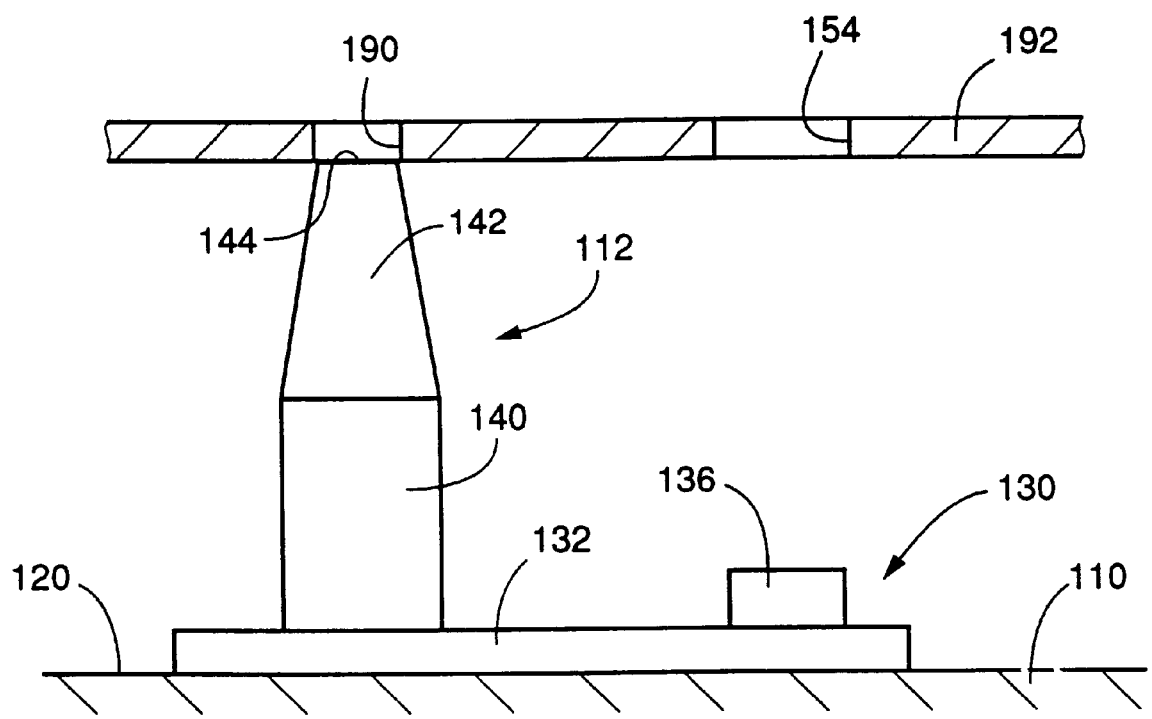
FIG. 8 is a cross-sectioned, front elevation view of another template used for positioning at least one board-support pin on the board-support base of the board-support pin device.

Each of the pin-position marks 152 of the template 150 may be only a circle equal to the circle as the reference pin mark 146 of each board-support pin 112, or only cross lines indicative of the center of the reference pin mark 146. In addition, it is possible to use a template 192, as shown in FIG. 8, having at least one pin-position hole 190 whose diameter is slightly larger than that of the board-support surface 144 of each board-support pin 112. In the case where the template 192 is employed, the template 192 is slightly pushed down, and elastically deformed such that the free end of each board-support pin 112 is loosely fitted in the corresponding pin-position hole 190. In this state, the tool is inserted in the corresponding tool insertion hole 154 and the bolt 136 is fastened by the tool, whereby each board-support pin 112 is fixed at a predetermined position on the board-support base 110. Thus, the operation for positioning each board-support pin 112 is more easily performed.

Figure 9:
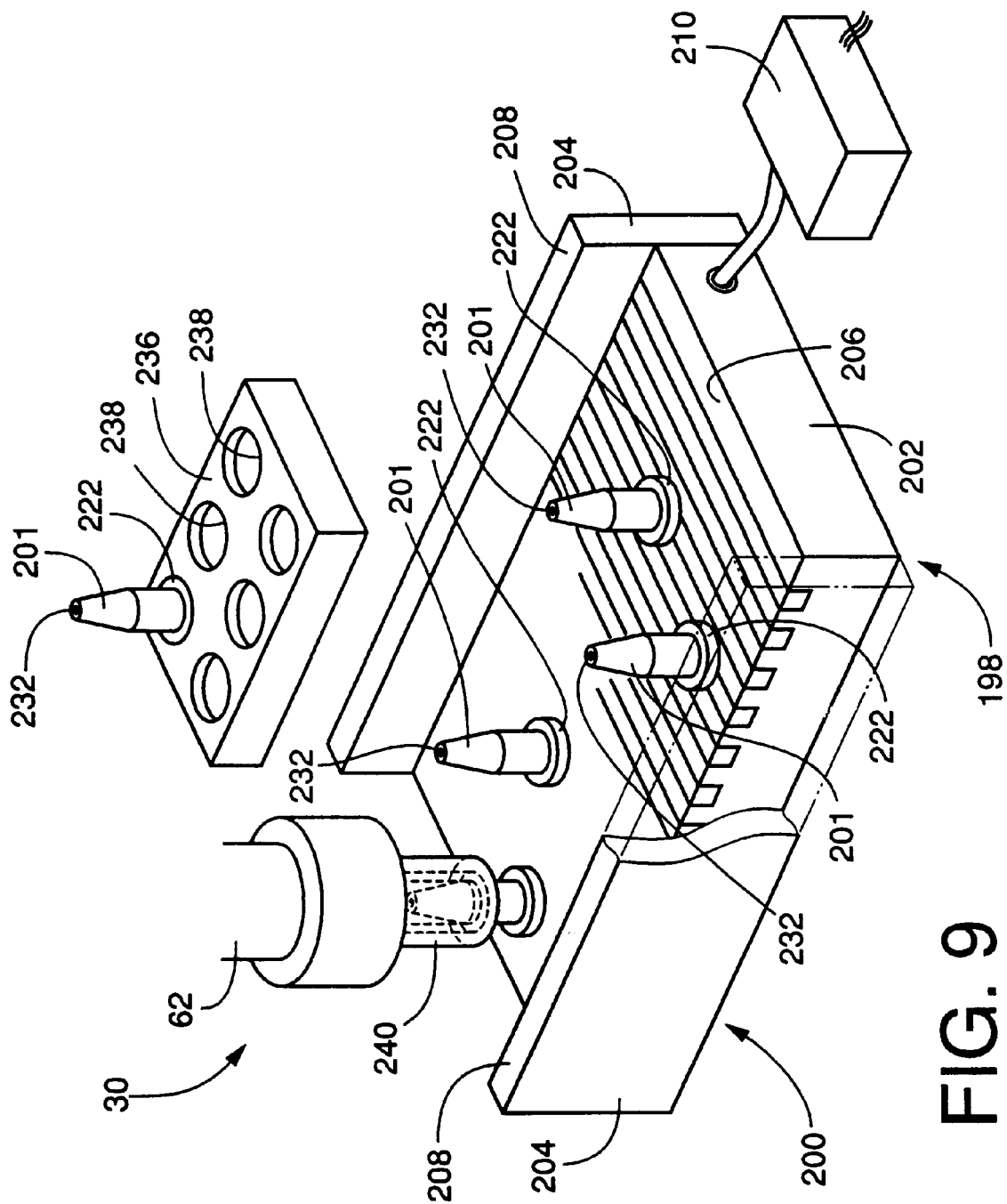
FIG. 9 is a perspective view of another board-support pin device as another embodiment of the present invention.

While the present invention has been described in its preferred embodiment by reference to the drawings, it is to be understood that the invention may otherwise be embodied. FIG. 9 shows a second embodiment of the present invention which relates to a second board-support pin device 198 which is employed in the EC mounting system 12 in place of the board-support pin device 74 of the board supporting device 20. The same reference numerals as used in the first embodiment are used to designate the corresponding elements or parts of the second embodiment, and the description thereof is omitted. The second board-support pin device 198 includes a board-support base 200 and a plurality of board-support pins 201. The board-support base 200 includes a bottom wall 202 and a pair of side walls 204 which are integrally formed with each other. The pair of side walls 204 extend parallel to the X-axis direction. The bottom wall 202 is formed of a magnetic material, and has a flat plate-like shape. An upper surface of the bottom wall 202 provides a flat, horizontal pin-attachment surface 206. An upper surface of each of the pair of side walls 204 provides a horizontal support surface 208. The bottom wall 202 incorporates a plurality of coils. The pin-attachment surface 206 of the bottom wall 202 is magnetized by an exciting current supplied to the coils. The bottom wall 202 is connected, via a code and a control box 210, to an electric-power source (not shown) for supplying the exciting current to the coils. The control box 210 is controlled by the control device 160.

Figure 10:
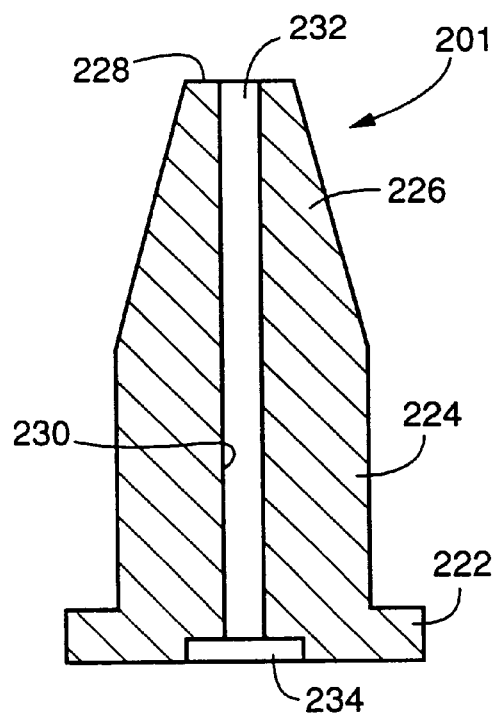
FIG. 10 is a cross-sectioned, front elevation view of a board-support pin of the board-support pin device of FIG. 9.

Each of the board-support pins 201 is formed of a magnetic material. As shown in FIG. 10, the board-support pin 201 includes a seating 222, a cylindrical base portion 224 which projects from the seating 222, and a free-end portion 226 having a truncated cone shape. The diameter of the free-end portion 226 decreases in a direction toward a free-end surface thereof. The free-end surface of the free-end portion 226 provides a horizontal board-support surface 228 for supporting the PCB 24. An air passage 230 is formed through the board-support pin 201 in its axial direction. An opening of the air passage 230 in the board-support surface 228 is used as a reference pin mark 232. A circular cutout 234 having a larger diameter than that of the air passage 230 is formed in a lower surface of the seating 222 which is attached to the pin-attachment surface 206, whereby the air passage 230 opens, via the cutout 234, in the lower surface of the seating 222. The board-support pins 201 are accommodated in a pin accommodator 236. The pin accommodator 236 has a plurality of pockets 238 which are equally spaced from one another. The board-support pins 201 are respectively accommodated in the pockets 238 of the pin accommodator 236. The shape and size of each of the pockets 238 is predetermined so as to accommodate the seating 222 of each board support pin 201.

Each of the board-support pins 201 is picked up, by a component holder head 30, from the pin accommodator 236, and is positioned on the board-support base 200. The component holder head 30 includes a nozzle holder 62 and a pin holder 240 which is detachably attached to the nozzle holder 62, as shown in FIG. 9. The pin holder 240 is provided with a collet chuck (not shown) which holds and releases each board-support pin 201. By control of a positive air pressure supplied through a first passage formed in the nozzle holder 62, the collet chuck is selectively placed in a pin-hold position in which the diameter of the pin holder 240 is reduced to hold the board-support pin 201, and a pin-release position in which the diameter of the pin holder 240 is enlarged to release the board-support pin 201. The nozzle holder 62 alternatively holds either the pin holder 240 or the suction nozzle 60 for sucking each EC 32. Therefore, the nozzle holder 62 additionally has a second passage through which a negative air pressure is supplied to the suction nozzle 60 for sucking each EC 32. The second passage is selectively communicated, by a solenoid-operated direction-control valve, with the negative air pressure source and the atmosphere, and with the positive air pressure source.

Each board-support pin 201 is attached to the board-support base 200 as described below. The component holder head 30 is moved, by the X-Y robot 48, to the pin accommodator 236. The pin holder 240 holds the board-support pin 201 having a predetermined pin number. Based on the corresponding set of pin-position data stored in the RAM 166 of the control device 160, the component holder head 30 holding the board-support pin 201 is moved to a position above a reference position defined by the set of pin-position data on the pin-attachment surface 206. Subsequently, when the pin holder 240 holding the board-support pin 201 is lowered by the elevating and lowering device 52, the second passage of the nozzle holder 62 is communicated with the positive air pressure source, so that compressed air is supplied, through the pin holder 240, to the air passage 230 of the board-support pin 201. Accordingly, the board-support pin 201 is moved toward the pin-attachment surface 206, while injecting the compressed air from the opening formed in the seating 222 thereof. Thus, dust particles present on the pin-attachment surface 206 are swept away by the injected compressed air, and subsequently the board-support pin 201 is seated on the pin-attachment surface 206. Then, the pin-attachment surface 206 is magnetized to attract the board-support pin 201, by magnetic force. When the supply of compressed air from the second passage of the nozzle holder 62 is stopped, the collet chuck of the pin holder 240 releases the board-support pin 201, and separates from the board-support pin 201 by elevation of the component holder head 30. When the component holder head 30 is elevated, the board-support pin 201 is not dislocated on the pin-attachment surface 206 because the board-support pin 201 is fixed to the pin-attachment surface 206 by the magnetic attraction force. After the board-support pin 201 is completely separated from the pin holder 240, the pin-attachment surface 206 is demagnetized.

The above operation of the component holder head 30 is repeated, and the plurality of the board-support pins 201 are sequentially positioned on the pin-attachment surface 206 of the board-support base 200. After the last board-support pin 201 is positioned on the pin-attachment surface 206, the magnetization of the pin-attachment surface 206 is maintained so that all the board-support pins are fixed to the board-support base 200. In this state, the respective board-support surfaces 228 of all the board-support pins 201 and the two support surfaces 208 of the board-support base 200 are located on a common horizontal plane.

Next, in the same manner as that employed in the first embodiment, an image of the reference pin mark 232 of each of the board-support pins 201 is taken by the CCD camera 56 disposed on the component holder head 30, and it is judged whether the position of the each board-support pin 201 is appropriate. Positional errors between the actual position of the each board-support pin 201 and the reference position defined by the corresponding set of pin-position data, and judgment information indicative of a result of the judgment are stored in association with the corresponding pin number in the RAM 166. A batch of data indicative of the positional errors and the judgment information is supplied to the control device 160 which controls the movement of the component holder head 30. If the position of the each pin 201 is not appropriate, correction amounts are calculated based on the data indicative of the positional errors, and the actual position of the pin 201 is corrected by the component holder head 30. Specifically, the component holder head 30 is moved to above the pin 201 positioned at the incorrect position, and the pin holder 240 of the head 30 is engaged with the pin 201. At this time, the collet chuck provided in the pin holder 240 has been opened and the pin-attachment surface 206 has been demagnetized, so that the engagement of the pin holder 240 with the pin 201 is easily performed.

Subsequently, the collet chuck is closed, the pin 201 is held by the pin holder 240, and the head 30 holding the pin holder 240 is elevated. The head 30 is moved by the correction amounts, and then is lowered so that the pin 201 is positioned at the correct position on the pin-attachment surface 206. When the pin 201 is positioned on the surface 206, the surface 206 is magnetized and the pin 201 is fixed at the correct position. Thus, in the second embodiment, the position of each board-support pin 201 may be automatically corrected, whereby the efficiency of positioning of the board-support pins 201 is improved.

Figure 11:
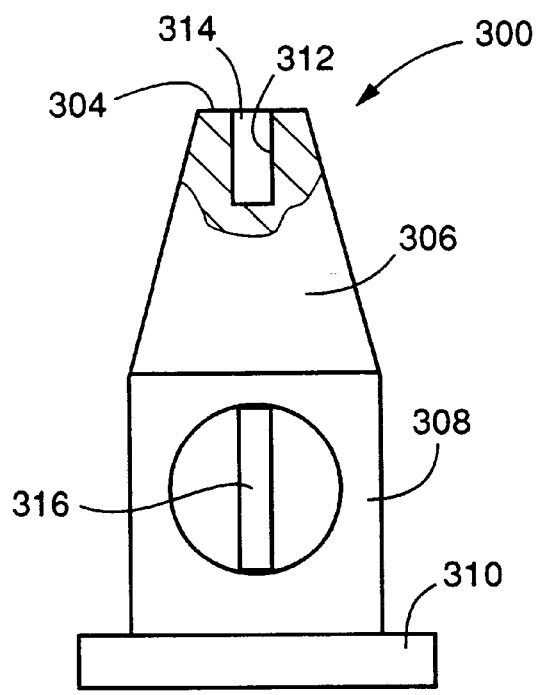
FIG. 11 is a partly cross-sectioned, front elevation view of a board-support pin of another board-support pin device as another embodiment of the present invention.

Further, it is not essentially required to employ the board-support pins 112 shown in FIG. 3 or the board-support pins 201 shown in FIG. 9. A different sort of board-support pins may be employed. A third embodiment of the present invention relates to a board-support pin 300 shown in FIG. 11. The board-support pin 300 includes a free-end portion 306 having a board-support surface 304, a base portion 308, and a seating 310, like the board-support pin 201 shown in FIG. 10. A hole 312 is formed in the board-support pin 300 so as to extend in an axis direction of the pin 300 and open in the board-support surface 304. An opening of the hole 312 in the surface 304 functions as a reference pin mark 314. The base portion 308 is provided by a magnetic base. Since the magnetic base is known in the art, the detail explanation thereof is omitted. In short, the magnetic base includes a lever 316, and the rotation of the lever 316 alternatively switches the seating 310 to an ON state wherein the seating 310 is magnetized and an OFF state wherein the seating 310 is demagnetized.

The board-support pin 300 is attached to a board-support base (not shown) formed of a magnetic material. Before the board-support pin 300 is positioned on the board-support base, the magnetic base as the base portion 308 is switched to the OFF state. In the same manner as that employed in the second embodiment shown in FIG. 9, the board-support pin 300 is positioned at a position on the board-support base by the pin holder 240 of the component holder head 30. Since the board-support base is not provided by an electromagnet, magnetization or demagnetization of the base does not occur. That is, the board-support pin 300 is just positioned on the board-support base. After all board-support pins 300 are positioned on the board-support base, the operator rotates the lever 316 of each of the board-support pins 300 so that the magnetic base is switched to the ON state. In the ON state, the each board-support pin 300 is fixed to the board-support base. Then, it is automatically judged whether the position of each of the board-support pins 300 is appropriate, in the same manner as that employed in the first or second embodiment. If the position of each board-support pin 300 is not appropriate, that is, the correction of the board-support pin 300 is needed, the magnetic base of the board-support pin 300 is switched to the OFF state by the operator. In the OFF state, the position of the board-support pin 300 is automatically corrected in the same manner as that used in the second embodiment shown in FIG. 9. After the correction of position of the board-support pin 300 is completed, the magnetic base is switched to the ON state.

In the third embodiment, after all the board-support pins 300 are positioned on the board-support base, the operator switches each of the respective magnetic bases to the ON state. However, the operator may switch the magnetic base of each pin 300 to the ON state just after the each pin 300 is positioned on the board-support base. In latter case, it is preferable to control the component holder head 30 to position the each pin 300 on the board-support base in response to a set of command data which is, by the operator, input through the operation of a bottom or the like.

Additionally, each of the board-support pins 201, 300 may be manually positioned by the operator on the board-support base, in the same manner as that employed in the first embodiment.

Figure 12:
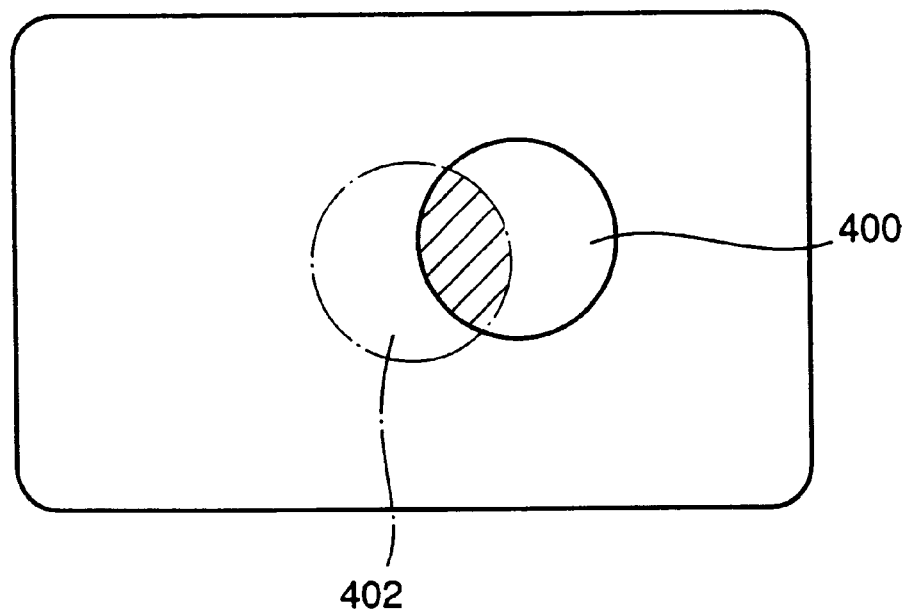
FIG. 12 is a schematic view for explaining another method of examining a position of a board-support pin, as another embodiment of the present invention.

In each of the illustrated embodiments, it is judged whether the actual position of each board-support pin 112, 201, 300 is appropriate or not, by comparing the actual center point of the reference pin mark 146, 232, 314 calculated based on the image of the reference pin mark 146, 232, 314 taken by the CCD camera 56 with the X and Y coordinates of the reference position of the board-support pin 112, 201, 300 stored in the RAM 166. However, a different method of judging whether the position of each board-support pin is appropriate or not may be employed. For example, in a method shown in FIG. 12, a taken image of a reference pin mark 400 provided on each board-support pin is compared with a reference pin-mark image 402 (shown in one-dot chain line in FIG. 12) indicative of a reference position of the each board-support pin. The reference pin-mark image 402 is pre-stored in the RAM 166. If an overlapping region of the taken image of the reference pin mark 400 and the reference pin-mark image 402 is not less than a predetermined first ratio (%), or if a non-overlapping region of the taken image of the reference pin mark 400 and the reference pin-mark image 402 is not more than a predetermined second ratio (%), it is judged that the position of the each board-support pin is appropriate, and vice versa.

Figure 13:
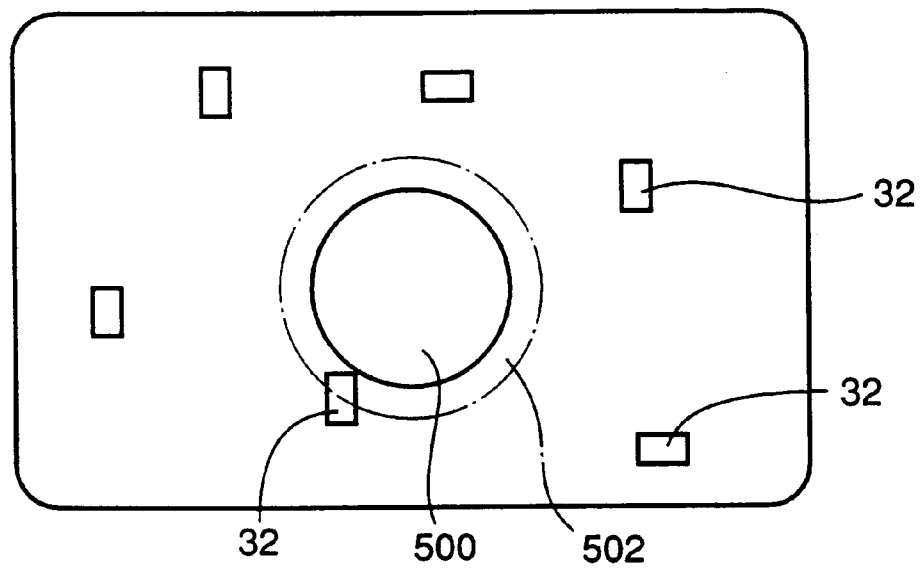
FIG. 13 is a schematic view for explaining another method of examining a position of a board-support pin, as another embodiment of the present invention.

Moreover, it is possible to judge whether the actual position of each board-support pin is appropriate or not, by comparing a taken image of a reference pin mark 500 provided on the each pin with reference-component-position information indicative of a reference region of at least one EC 32 mounted on the back surface of the PCB 24, as shown in FIG. 13. The reference-component-position information is pre-stored in the RAM 166. For example, a safety region 502 (shown in one-dot chain line in FIG. 13) is provided around the image (shown in a solid line in FIG. 13) of the reference pin mark 500, based on errors produced when the image of the board-support pin is taken by the CCD camera 56, errors produced when the EC 32 is mounted on the PCB 24, and other factors. If the safety region 502 does not overlap the reference region of the EC 32, it is judged that the position of the board-support pin is appropriate. In the case of FIG. 13, it is judged that the position of the board-support pin is not appropriate because the safety region 502 overlaps the reference region of the EC 32.

In each of the illustrated embodiments, the CCD camera 56 attached to the component mounting head 30 for taking the image of each reference board mark is utilized as the image taking device for taking the image of each reference pin mark 146, 232, 314, 400, 500 of the board-support pin 112, 201, 300. However, an exclusive image taking device for taking an image of each board-support pin may be employed, in addition to the CCD camera 56 for taking the image of each reference board mark.

In each of the second and third embodiments, the component holder head 30 for holding each EC 32 is utilized for positioning each board-support pin 201, 300 on the board-support base 200 and correcting the position of the each board-support pin. However, an exclusive device for positioning each board-support pin and correcting the position of the each board-support pin may be employed, in addition to the component holder head 30.

Further, the present invention may be applied to not only the EC mounting system 12 of FIG. 1, but also a system including an EC mounting device wherein a plurality of component holder heads are rotated about a common axis line.

It is possible to combine one or more constitutional elements of each one of the illustrated embodiments with that or those of the other embodiments.

It is to be understood that the present invention may be embodied with other changes, improvements, and modifications that may occur to the person skilled in the art without departing from the scope and spirit of the invention defined in the appended claims.

What is claimed is:

1. A method of examining a position of at least one board-support pin which is continuously movable, and positionable at an arbitrary position, on a board-support base for supporting a printed-circuit board under a back surface thereof, the method comprising the steps of:

moving at least one of an image taking device and the board-support base relative to the other of the image taking device and the board-support base, in a direction parallel to the board-support base, so that the image taking device is positioned at a position opposed to a free end of the board-support pin positioned on the board-support base;

taking an image of the board-support pin, with the image taking device positioned at the position opposed to the free end of the board support pin;

judging, based on the taken image, whether at least one positional error of at least one actual position of the board-support pin from at least one reference position in at least one reference direction parallel to the board-support base falls within a reference range, and when it is judged that the positional error falls within the reference range, judging that the actual position of the board-support pin is appropriate, and when it is judged that the positional error does not fall within the reference range, judging that the actual position of the board-support pin is not appropriate; and producing judgment information indicative of a result of the judgment.

2. A method according to claim 1, further comprising a step of displaying the judgment information on a display device so that an operator recognizes the judgment information.

3. A method according to claim 1, wherein the step of judging whether the position of the board-support pin is appropriate comprises comparing the taken image with reference-pin-position information indicative of said at least one reference position of the pin.

4. A method according to claim 1, wherein the step of judging whether the position of the board-support pin is appropriate comprises comparing the taken image with reference-component-position information indicative of a reference position of at least one electric component mounted on the back surface of the printed-circuit board.

5. A method according to claim 1, wherein the step of judging comprises judging, based on the taken image, whether respective positional errors of respective actual positions of the board-support pin from respective reference positions in two reference directions each of which is parallel to the board-support base and which are perpendicular to each other fall within a reference circular range, and when it is judged that the positional errors fall within the reference circular range, judging that the actual positions of the board-support pin are appropriate, and when it is judged that the positional errors do not fall within the reference circular range, judging that the actual positions of the board-support pin are not appropriate.

6. A method according to claim 1, further comprising a step of displaying, on a display device, the positional error of the actual position of the board-support pin, when it is judged that the positional error does not fall within the reference range and that the actual position of the board-support pin is not appropriate, so that an operator recognizes the positional error.

7. A method of examining a position of at least one board-support pin which is positioned on a board-support base for supporting a printed-circuit board under a back surface thereof, the method comprising the steps of:

taking an image of the board-support pin at a position opposed to a free end of the pin;

judging whether the position of the board-support pin is appropriate, based on the taken image, producing judgment information indicative of a result of the judgment; and supplying the judgment information to a pin-position correcting device so that the pin-position correcting device automatically corrects the position of the board-support pin, based on the judgment information.

8. A method of examining a position of at least one board-support pin which is positioned on a board-support base for supporting a printed-circuit board under a back surface thereof, the method comprising the steps of:

taking an image of the board-support pin, at a position opposed to a free end of the pin, with an image taking device which is for taking an image of each of a plurality of reference board marks provided on the printed-circuit board so as to detect a position of the printed-circuit board;

judging whether the position of the board-support pin is appropriate, based on the taken image; and producing judgment information indicative of a result of the judgment.

9. A method of examining a position of at least one board-support pin which is positioned on a board-support base for supporting a printed-circuit board under a back surface thereof, a reference pin mark being provided on a free-end surface of the board-support pin, the free-end surface providing a board-support surface for supporting the printed-circuit board, the method comprising the steps of;

taking an image of the reference pin mark of the board-support pin, at a position opposed to the free-end surface of the board-support pin;

judging whether the position of the board-support pin is appropriate, based on the taken image; and producing judgment information indicative of a result of the judgment.

10. A method according to claim 9, wherein a hole is formed in the board-support pin so as to open in the free-end surface of the pin, and wherein the reference pin mark comprises the opening of the hole.

11. An apparatus for examining a position of at least one board-support pin which is positioned on a board-support base for supporting a printed-circuit board under a back surface thereof, the apparatus comprising:

an image taking device which takes an image of the board-support pin, at a position opposed to a free end of the pin;

a moving device which moves at least one of the image taking device and the board-support base relative to the other of the image taking device and the board-support base in a direction parallel to the board-support base;

a first controller which controls the moving device such that the image taking device is positioned at the position opposed to the free end of the board-support pin; and a judging device which judges whether the position of the board-support pin is appropriate, based on the image taken by the image taking device, and which produces judgment information indicative of a result of the judgment.

12. An apparatus according to claim 11, further comprising a second controller which controls the moving device such that the image taking device is positioned at each of a plurality of positions respectively opposed to a plurality of reference board marks provided on the printed-circuit board.

* * * * *